United States Patent [19]

Longardner et al.

[11] Patent Number: 5,220,954
[45] Date of Patent: Jun. 22, 1993

[54] PHASE CHANGE HEAT EXCHANGER

[75] Inventors: Robert L. Longardner, Indianapolis; William J. Longardner, Carmel, both of Ind.

[73] Assignee: Shape, Inc., Indianapolis, Ind.

[21] Appl. No.: 957,654

[22] Filed: Oct. 7, 1992

[51] Int. Cl.[5] ............................................. F28D 20/00
[52] U.S. Cl. .................................. 165/10; 165/104.11
[58] Field of Search ............................ 165/10, 104.11

[56] References Cited

U.S. PATENT DOCUMENTS

| | | |
|---|---|---|
| 2,856,506 | 10/1958 | Telkes . |
| 3,960,207 | 6/1976 | Boer ................................. 165/10 |
| 4,117,882 | 10/1978 | Shurcliff . |
| 4,127,161 | 11/1978 | Clyne et al. . |
| 4,219,072 | 8/1980 | Barlow, Sr. . |
| 4,246,466 | 1/1981 | Rice et al. . |
| 4,291,750 | 9/1981 | Clyne et al. . |
| 4,332,290 | 6/1982 | Skala ................................ 165/10 |
| 4,445,566 | 5/1984 | Laing et al. ...................... 165/10 |
| 4,474,171 | 10/1984 | Caproon et al. . |
| 4,509,344 | 4/1985 | Ludwigsen et al. . |
| 4,535,837 | 8/1985 | Ishii et al. . |
| 4,584,843 | 4/1986 | Pronger, Jr. et al. . |
| 4,609,036 | 9/1986 | Schrader . |
| 4,709,750 | 12/1987 | White . |
| 4,768,345 | 9/1988 | Kardas . |
| 4,807,696 | 2/1989 | Colvin et al. . |
| 4,899,810 | 2/1990 | Fredley . |
| 4,976,308 | 12/1990 | Faghri .............................. 165/10 |

FOREIGN PATENT DOCUMENTS

| | | | |
|---|---|---|---|
| 3018801 | 11/1981 | Fed. Rep. of Germany ........ 165/10 |
| 117993 | 7/1983 | Japan ................................. 165/10 |
| 120085 | 7/1983 | Japan ................................. 165/10 |

OTHER PUBLICATIONS

*The Dynamics of Energy Storage for Paraffin Wax in Cylindrical Containers*, A. S. Menon; M. E. Weber; S. A. Mujumdar, The Canadian Journal of Chemical Engineering, vol. 61, pp. 647-653, Oct. 1983.

*Heat Exchanger Performance for Latent Heat Thermal Energy Storage System*, Hassan E. S. Fath, Energy Consers. Mgmt., vol. 31, No. 1, pp. 149-155, 1991.

Primary Examiner—Albert W. Davis, Jr.
Attorney, Agent, or Firm—Barnes & Thornburg

[57] ABSTRACT

A heat exchanger for a phase change material is provided which comprises a container holding the phase change material, a tube surrounding the container to define an annular space therebetween, and at least two divider walls extending across the annular space to divide the annular space into at least upper and lower flow passageways. The heat exchanger can preferably be operated in either a melt cycle or a freeze cycle. In the melt cycle, the lower flow passageway is configured to receive heat exchange fluid to initiate melting of the phase change material from the bottom so that newly-formed liquid phase change material is displaced toward the top of the container. In the freeze cycle, the upper flow passageway receives heat exchange fluid to initiate freezing of the phase change material at the top. The newly-formed solid phase change material falls to the bottom of the container, displacing liquid phase change material toward the top.

19 Claims, 7 Drawing Sheets

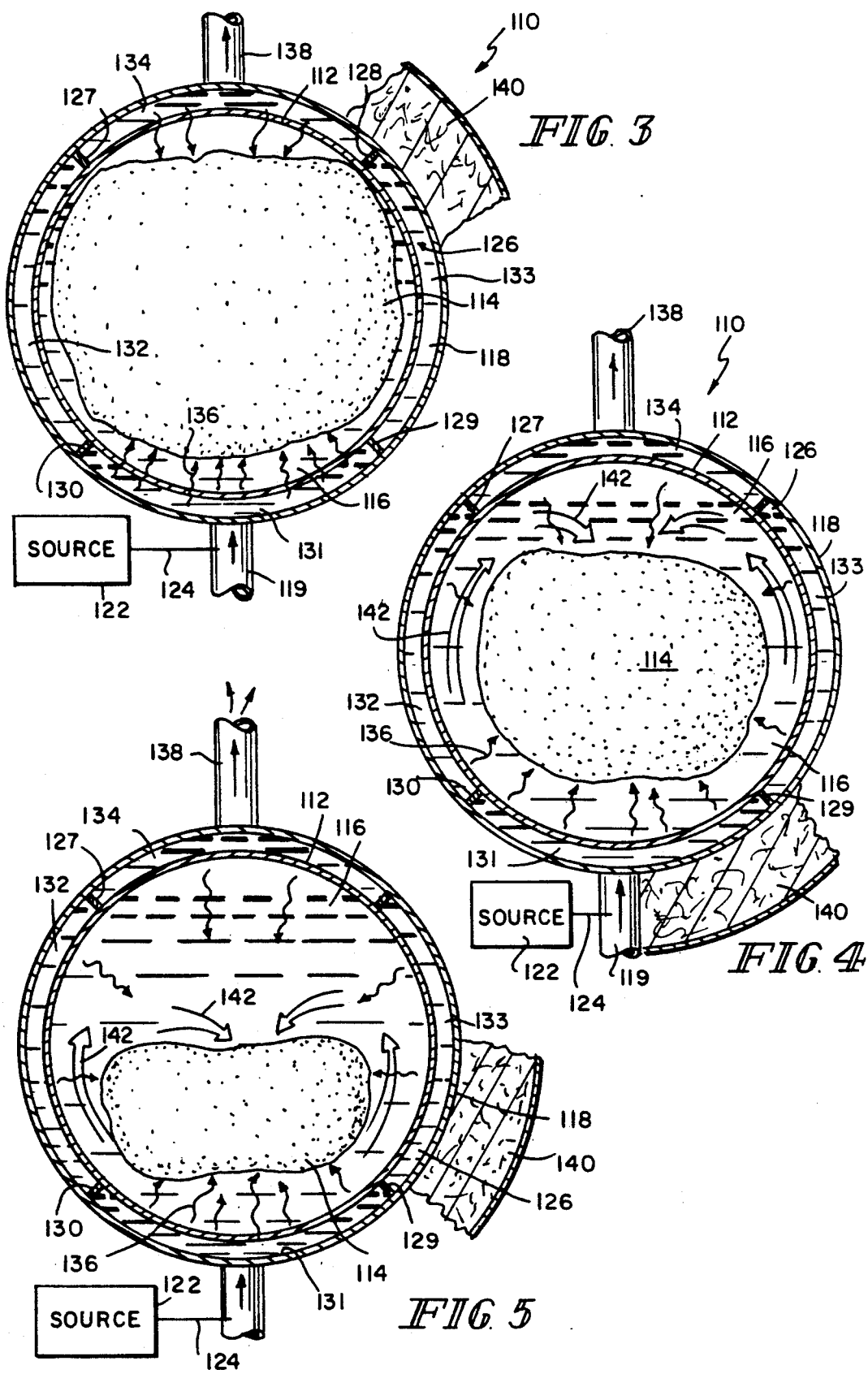

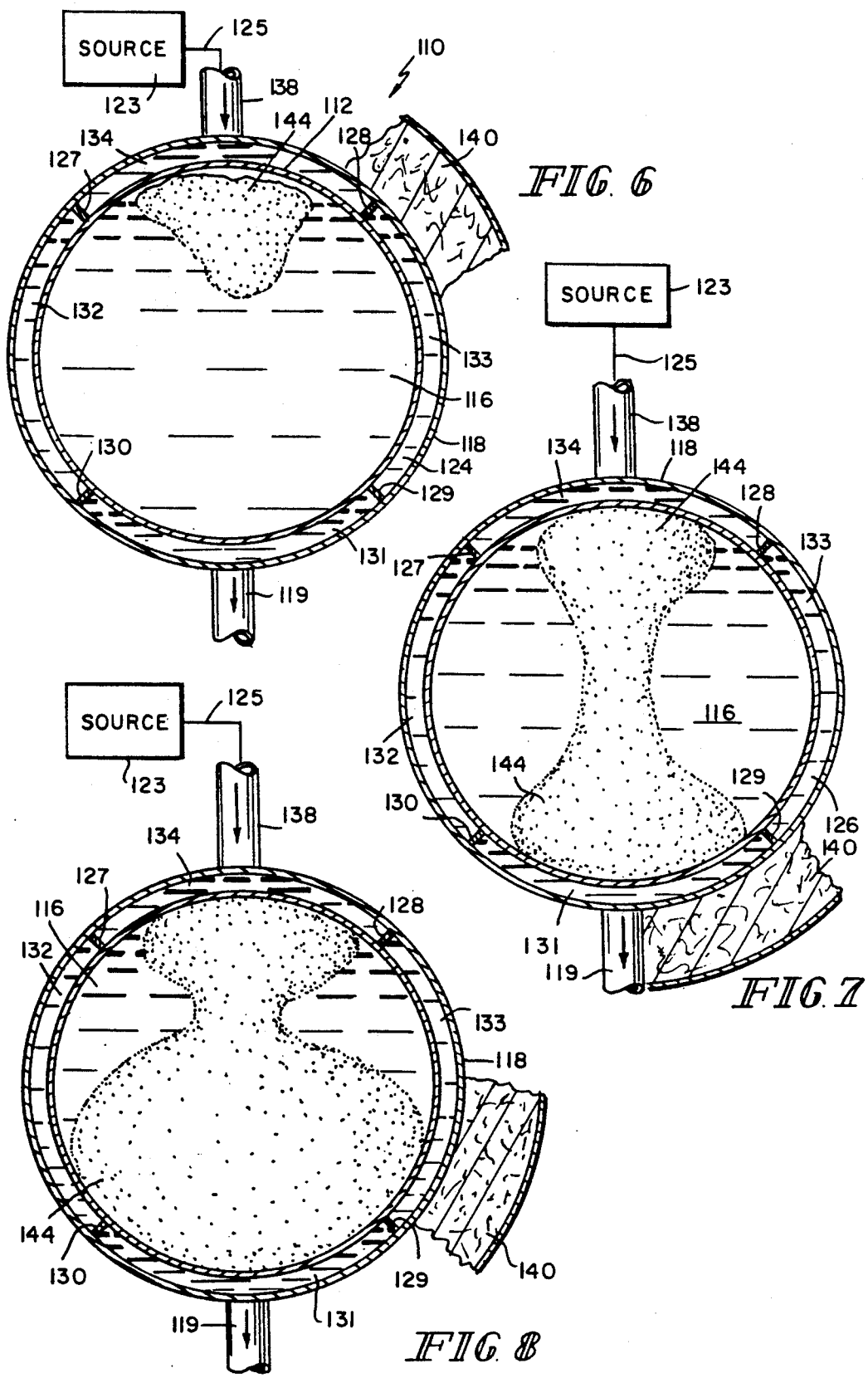

| RUN NO. | MELT/ FREEZE | UPPER REGION THERMOCOUPLES | | | LOWER REGION THERMOCOUPLES | | |
|---|---|---|---|---|---|---|---|
| | | #1 | #2 | #3 | #4 | #5 | #6 |
| 1 | M | 3 | 1 | 6 | 4 | 5 | 2 |
| | F | 5 | 6 | 4 | 1 | 2 | 3 |
| 2 | M | 3 | 1 | 2 | 5 | 6 | 4 |
| | F | 4 | 5 | 6 | 1 | 2 | 3 |
| 3 | M | 3 | 2 | 1 | 6 | 5 | 4 |
| | F | 5 | 6 | 4 | 1 | 2 | 3 |
| 4 | M | 3 | 2 | 1 | 6 | 5 | 4 |
| | F | 4 | 5 | 6 | 1 | 2 | 3 |
| 5 | M | 3 | 2 | 1 | 6 | 5 | 4 |
| | F | 4 | 5 | 6 | 1 | 2 | 3 |
| 6 | M | 3 | 1 | 2 | 5 | 4 | 6 |
| | F | 3 | 1 | 2 | 4 | 5 | 6 |
| 7 | M | 1 | 3 | 2 | 5 | 4 | 6 |
| | F | 1 | 3 | 5 | 2 | 4 | 6 |
| 8 | M | 1 | 4 | 2 | 6 | 5 | 3 |
| | F | 1 | 3 | 5 | 2 | 4 | 6 |
| 9 | M | 2 | 3 | 1 | 5 | 4 | 6 |
| | F | 1 | 3 | 5 | 2 | 4 | 6 |
| 10 | M | 1 | 3 | 2 | 6 | 5 | 4 |
| | F | 5 | 4 | 6 | 1 | 2 | 3 |
| 11 | M | 3 | 1 | 2 | 6 | 5 | 4 |
| | F | 5 | 6 | 4 | 1 | 2 | 3 |
| 12 | M | 1 | 2 | 3 | 6 | 5 | 4 |
| | F | 6 | 4 | 5 | 1 | 2 | 3 |
| 13 | M | 3 | 5 | 2 | 1 | 4 | 6 |
| | F | 2 | 3 | 5 | 1 | 4 | 6 |
| 14 | M | 3 | 1 | 2 | 6 | 5 | 4 |
| | F | 1 | 3 | 5 | 2 | 4 | 6 |
| 15 | M | 3 | 4 | 6 | 1 | 2 | 5 |
| | F | 2 | 3 | 5 | 1 | 4 | 6 |
| 16 | M | 3 | 2 | 4 | 1 | 5 | 6 |
| | F | 2 | 3 | 5 | 1 | 4 | 6 |
| 17 | M | 1 | 3 | 2 | 6 | 5 | 4 |
| | F | 5 | 4 | 6 | 1 | 2 | 3 |
| 18 | M | 1 | 3 | 2 | 6 | 5 | 4 |
| | F | 4 | 5 | 6 | 1 | 2 | 3 |

LEGEND: M = MELT; F = FREEZE

FIG. 16

PHASE CHANGE HEAT EXCHANGER

BACKGROUND AND SUMMARY OF THE INVENTION

The present invention relates to a heat exchanger incorporating an encapsulated phase change material to provide heat storage and heat exchange. More particularly, the present invention relates to an improved phase change material heat exchanger in which the heat exchange fluid is directed along a flow path designed to induce convective currents in the molten phase change material and direct such currents to contact the remaining solid phase change material to promote solid to liquid phase change, while also being capable of promoting liquid to solid phase change when the flow direction of the heat exchange fluid is reversed.

Inorganic phase change materials (PCM's), alone or combined in eutectic mixtures, release or store heat isothermally as they change phase between liquid and solid. Phase change materials typically have high latent heats of fusion, such that significant amounts of energy can be stored in such materials as they change phase from solid to liquid, and such energy can be retrieved and dissipated to a heat sink or the like by causing the phase change material to solidify.

Latent heat thermal energy is stored in hydrated inorganic salt crystals due to the vibrating energy developed at the crystal frequency when the crystals are excited by temperature increase. At a tuned wavelength operating at a very narrow window of temperatures, salt crystals will form in a supersaturated solution. It is this property that sustains the isothermal responses. For example, it takes 72 BTU's of energy at a temperature of 242° F. to vibrate and dissociate one pound of $MgCl_2.6H_2O$ crystals. Likewise, at the same frequency, the hydrate will crystallize, releasing energy isothermally at 242° F. at the rate of 72 BTU's per pound of $MgCl_2.6H_2O$.

Various hydrated salt compositions have long been recognized as candidates for use as phase change materials in thermal energy storage devices. Such compositions are listed and described in G. A. Lane, "Solar Heat Storage: Latent Heat Materials," CRC Press (1983). Because some of the hydrated salt compositions are prone to supercooling, they are typically mixed with nucleating agents.

According to the present invention, a phase change material heat exchanger is provided which comprises a container holding a phase change material, a tube surrounding the container to define an annular space therebetween, and at least two divider walls extending between the tube and the container across the annular space to divide the annular space into at least a lower flow passageway for heat exchange fluid and an upper flow passageway for heat exchange fluid.

The phase change material is selected to have a solid density greater than its liquid density. The tube is connected in fluid communication with a source of heat exchange fluid to allow heat exchange fluid to flow through the annular space to exchange heat with the phase change material. The lower flow passageway is designed to receive heat exchange fluid from the fluid source at a temperature sufficient to initiate melting of the solid phase change material, and the upper flow passageway is designed to receive the heat exchange fluid from the lower flow passageway to flow in counterflow relationship with the heat exchange fluid flowing in the lower passageway. This results in the establishment of a vertical temperature profile in the phase change material. That is, the phase change material is melted starting at a lower portion thereof to cause newly-formed liquid phase change material to be displaced to the upper portion of the container, enhancing convective heat transfer.

Advantageously, the upper flow passageway may be configured to receive heat exchange fluid from a second source at a temperature sufficient to initiate freezing of the phase change material. The phase change material is frozen starting at its upper portion so that the newly-formed solid phase change material falls by gravity to the lower portion of the container. Thus, the phase change material heat exchanger operates to effectively "store" latent heat of fusion during the heating cycle and to "release" latent heat of fusion during the cooling cycle, maintaining a vertical temperature profile during both heating and cooling cycles to take advantage of convective heat transfer.

In one aspect of the invention, the phase change material heat exchanger includes four divider walls extending between the tube and the container across the annular space. The divider walls cooperate to define a lower flow passageway for receiving heat exchange fluid from the fluid source, a pair of intermediate flow passageways for receiving heat exchange fluid from the lower flow passageway, and an upper flow passageway for receiving heat exchange fluid from the intermediate passageways. Thus, through use of this configuration, a three-pass heat exchanger is provided.

According to another aspect of the invention, the phase change material heat exchanger further includes a second tube extending through the container to provide a flow passageway for heat exchange fluid which has been discharged from the upper flow passageway. The second tube may be positioned concentrically within the container and receives heat exchange fluid for flow in counterflow relationship with the heat exchange fluid flowing in the upper passageway.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description refers particularly to the accompanying figures in which:

FIG. 3 is a sectional end view of a three-pass phase change heat material exchanger in accordance with the present invention during a heating cycle showing heat being applied to a lower portion of the phase change material;

FIG. 4 is a view similar to FIG. 3 showing the phase change material in an intermediate stage of melting and illustrating the solid phase change material dropping toward a lower portion of the heat exchange apparatus and thereby displacing liquid phase change material to an upper portion of the heat exchange apparatus;

FIG. 5 is a view similar to FIGS. 3 and 4 showing the phase change material at an advanced stage of melting;

FIG. 6 is a sectional end view of the three-pass phase change material heat exchanger of FIGS. 3–5 during the cooling cycle showing the formation of crystals of phase change material at the upper portion of the heat exchange apparatus;

FIG. 7 is a view similar to FIG. 6 showing the phase change material at an intermediate stage of freezing;

FIG. 8 is a view similar to FIGS. 6 and 7 showing the phase change material at an advanced stage of freezing;

FIG. 16 is a table showing date collected during tests of the prototype phase change material heat exchanger of FIGS. 14 and 15.

DETAILED DESCRIPTION OF THE INVENTION

Figure 1:
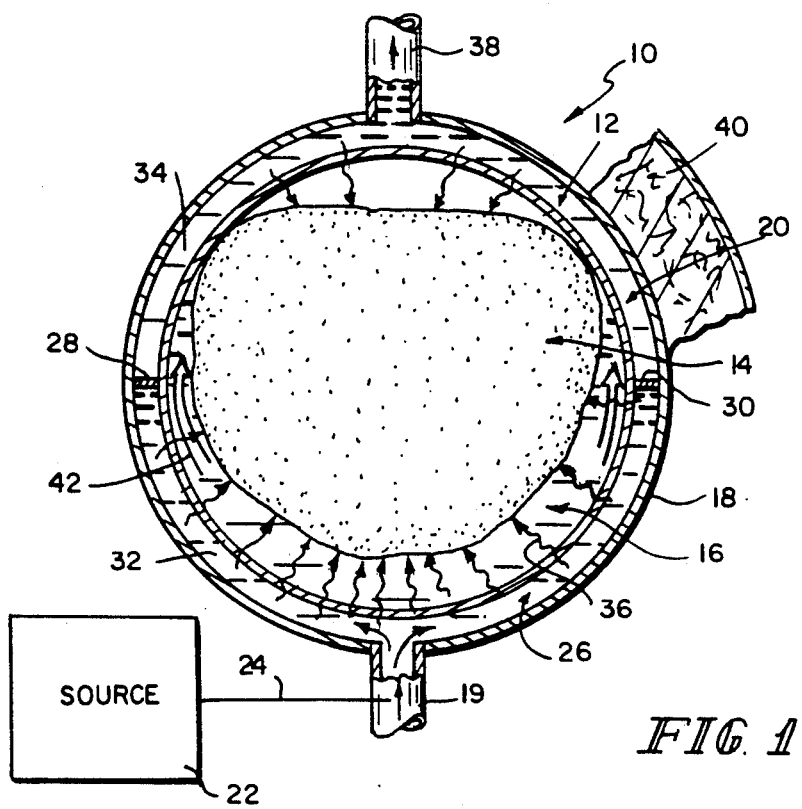
FIG. 1 is a sectional end view of a two-pass phase change material heat exchanger in accordance with the present invention during a heating cycle showing heat being applied predominantly to a lower portion of the phase change material.
Figure 2:
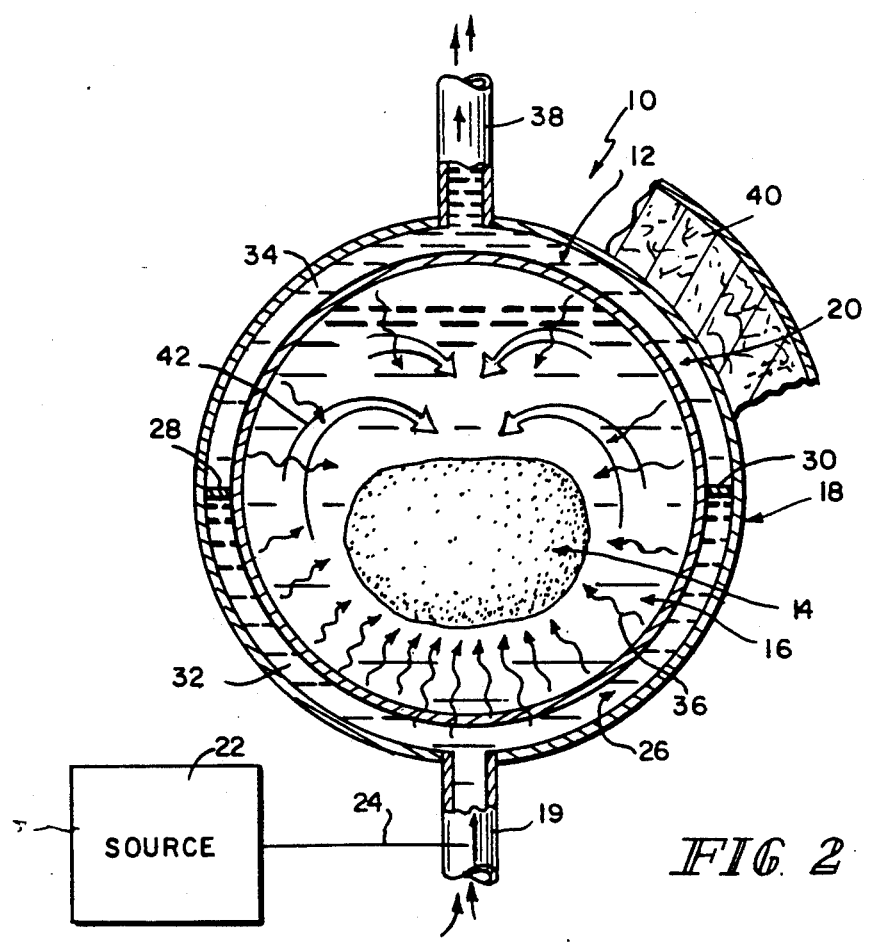
FIG. 2 is a view similar to FIG. 1 showing the phase change material at an advanced stage of melting.

One embodiment of a phase change material heat exchanger in accordance with the present invention is illustrated in cross section in FIGS. 1-2. The exchanger of FIGS. 1-2 is a two-pass concentric tube heat exchanger which advantageously provides for heating of the phase change material from the bottom to create convective currents as liquid phase change material is displaced upward.

Specifically, a phase change material heat exchanger 10 includes a cylindrical container 12 or encapsulation chamber which is loaded with a phase change material 14. Typically, container 12 is filled to about 90% of its capacity with phase change material 14, the remaining 10% of capacity being left for phase change material expansion during the heating cycle. Where phase change material 14 has a significant amount of entrained water, it may be necessary to leave a greater percentage of expansion space.

The particular phase change material 14 for use in accordance with the present invention may be selected from a wide variety of commercially available phase change salts. Examples of phase change salts usable in accordance with the present invention include, without limitation, $CaCl_2.6H_2O$, $MgCl_2.6H_2O$, $CaCl_2.6H_2O/CaBr_2.6H_2O$, and $MgCl_2.6H_2O/Mg(NO_3)_2.6$; $H_2O$. All of these phase change materials, of course, have greater densities in their solid form than in their liquid form. Water, which has been used as a phase change material, is not useful in connection with the phase change material heat exchangers of the present invention. The phase change salt $MgCl2.6H2O$ has been found particularly suitable for use in the phase change material heat exchanger of the present invention.

Magnesium chloride hexahydrate as used in heat exchanger 10 would normally be used with one or more commercially available nucleating agents. A wide variety of nucleating agents may be chosen. For example, particularly preferred magnesium chloride hexahydrate formulations for use in accordance with the present invention are formulations of the type described in U.S. Pat. Nos. 4,338,208 and 4,406,805, relevant portions of which are incorporated herein by reference.

As shown in FIGS. 1 and 2, phase change material heat exchanger 10 includes container 12 and a tube 18 surrounding container 12 in concentric relationship therewith to define an annular space 20 therebetween. It will be recognized that a variety of geometries might be used for tube 18 and container 12, and the word "tube" as used herein is not meant to limit the heat exchanger geometry to cylindrical configurations. Tube 18 may, in fact, be spherical. Alternatively, tube 18 may be rectilinear. A macro encapsulation configuration may also be used.

Tube 18 is provided with a nipple or port 19 and a line 24 connected to nipple 19 provides means for connecting tube 18 in fluid communication with a first source 22 of heat exchange fluid. The heat exchange fluid is usually water, but a variety of other heat exchange fluids may be used. High temperature water (e.g. at about 220°–260° F.) available in industrial processes may be used.

The heat exchange fluid enters annular space 20 via nipple 19 and flows through annular space 20 to exchange heat with phase change solid 14 by indirect heat transfer through the wall of container 12.

Two divider walls or spacer bars 28, 30 extend between container 12 and tube 18. Divider walls 28, 30 comprise long metal strips which are welded either to the outside surface of container 12 or the inside surface of tube 18 and are sized so that tube 18 fits in tight-fitting slidable engagement with walls 28, 30. Thus, divider walls 28, 30 hold tube 18 in concentric relationship with container 12. Divider walls 28, 30 divide annular space 20 into a lower flow passageway 32 accommodating one pass of the heat exchange fluid and an upper flow passageway 34 accommodating another pass of the heat exchange fluid.

Tube 18 also includes another nipple 38 similar to nipple 19 and located on the same end of the tube longitudinally as is nipple 19. A second source of heat exchange fluid (not shown) is connected in fluid communication with nipple 38 to supply heat exchange fluid to upper flow passageway 34 during the phase change material freezing cycle as described below. Tube 18 is preferably covered with insulation 40.

Operation of a two-pass heat exchanger 10 in accordance with the present invention during a phase change material heating cycle is shown in FIGS. 1 and 2. In FIG. 1, heat exchange fluid from source 22 passes through line 24 and then through nipple 19 to reach lower flow passageway 32. The heat exchange fluid flows in lower flow passageway 32 from a first end (the end on which nipples 19, 38 are located) to the opposite end. The heat exchange fluid at this point is at high temperature and begins to transfer heat through the wall of container 12 to the solid phase change material 14. The solid phase change material 14 begins to melt at its lower portion, forming liquid phase change material 16.

The heat exchange fluid then enters upper flow passageway 34 and flows therein in counterflow relationship to the heat exchange fluid flowing in lower flow passageway 32 to again reach the end of tube 18 at which nipples 19, 38 are located. The heat exchange fluid then exits through nipple 38 to an operating system such as a refrigeration system or a heating, ventilating, and air conditioning (HVAC) system (not shown).

Advantageously, melting is achieved more rapidly and more efficiently through the present arrangement than through other flow arrangements heretofore attempted. The highest temperature heat exchange fluid is in the lower passageway, and the solid phase change material rests at or near the lower portion of container 12. As melting begins, liquid phase change material 16 forms at the lower portion of container 12. However, because the phase change material 16 is more dense in its solid state, the remaining solid phase change material 14 drops to the bottom of container 12, displacing the newly-formed liquid phase change material 16 to the top of container 12. To take fullest advantage of this phenomenon, it is important that the heat exchanger be level.

This process continues as the solid phase change material reaches an advanced stage of melting as shown in FIG. 2. The remaining solid phase change material is always at the bottom of container 12 and hence is always exposed to the highest temperature heat exchange fluid.

In addition, the newly-formed liquid phase change material 16, by its movement around the outer edges of the solid phase change material 14 to reach the upper portion of container 12, also enhances heat transfer. The moving liquid creates convective currents about the outside of the remaining solid phase change material as designated by arrows 42 in FIG. 2. This displacement of newly-formed liquid phase change material further assists in driving the melting process. The liquid phase change material 16 displaced to the upper region of container 12 creates an overpressure on the remaining solid phase change material, forcing the remaining solid phase change material toward the bottom of container 12, where it remains in conductance contact with the highest temperature heat exchange fluid. That is, a "bottom-up" temperature profile is established in the heat exchange apparatus.

This flow arrangement is reversed for use of phase change heat material exchanger 10 during the phase change material freezing cycle. That is, cold heat exchange fluid is fed from the second source (not shown) to annular space 20 through nipple 38. Thus, the cold heat exchange fluid flows first through upper flow passageway 34, exchanging heat through the wall of container 12 with the upper portion of the liquid phase change material 16. As solid phase change material crystals begin to form in the upper portion of container 12, they fall to the bottom of container 12, thus ensuring that the cold heat exchange fluid in upper passageway 34 is always adjacent liquid phase change material.

In the freezing cycle, the heat exchange fluid next passes through lower passageway 32 and exits through nipple 19 to line 24 for use in an operating system or the like as previously described. Here again, the falling solid crystals of phase change material displace liquid to the upper portions of container 12, setting up favorable convective currents which enhance heat transfer. In other words, a "top-down" temperature profile is established.

Another embodiment of a phase change heat material exchanger in accordance with the present invention is shown in FIGS. 3-8. There, a three-pass heat exchanger is shown in cross section. The three-pass heat exchanger 110 of FIGS. 3-5 includes four divider walls spaced equiangularly about the circumference of the container 112. Divider walls 129, 130 cooperate to define an arcuate region serving as a lower flow passageway 131. Divider walls 127, 130 cooperate to define another arcuate region serving as a first side flow passageway 132. Divider walls 128, 129 cooperate to define another arcuate region serving as a second side flow passageway 133. Divider walls 127, 128 cooperate to define another arcuate region serving as an upper flow passageway 134. It will be appreciated that the spacing of divider walls 127, 128, 129, and 130 can be varied to vary the volume available for flow through passageways 131, 132, 133, and 134. In addition, of course, the number of passes can be increased by providing additional divider walls.

As with the embodiment of the invention illustrated in FIGS. 1 and 2, the present embodiment includes a tube 118 surrounding container 112, the tube being connected in fluid communication with a source of heat exchange fluid. Tube 118 includes a nipple 119 on one end and another nipple 138 located on the opposite end longitudinally from nipple 119. Tube 118 is preferably insulated with insulation 140. Again, it is important that the heat exchanger be plumb in order to operate properly in the present application.

Operation of the three-pass heat exchanger during the phase change material heating cycle is illustrated in FIGS. 3-5. As shown, hot heat exchange fluid from a source 122 passes through line 124 and through nipple 119 to reach lower flow passageway 131. Line 124 thus provides means for connecting tube 1118 in fluid communication with source 122. The heat exchange fluid begins to melt the solid phase change material 114 at a lower portion as shown in FIG. 3. As liquid phase change material 116 continues to form, solid phase change material 114 begins to drop toward the bottom of container 112, displacing liquid phase change material 116 toward the top of container 112 as indicated by open arrows 142 in FIGS. 4-5. The displacement of liquid phase change material sets up convective currents as previously described, enhancing heat transfer from the heat exchange fluid to the phase change material.

The heat exchange fluid flows in lower flow passageway 131 along the entire length of tube 118, then reverses direction as a first portion of the fluid enters first side flow passageway 132 and a second portion of the fluid enters second side flow passageway 133. Heat exchange fluid thus flows simultaneously in both first and second side flow passageways 132, 133 in counterflow relationship to fluid flowing in lower flow passageway 131.

The heat exchange fluid thereafter exits the side flow passageways 132, 133 and enters upper flow passageway 134. Heat exchange fluid flows in upper flow passageway 134 in counterflow relationship to the fluid flowing in side flow passageways 132, 133 and therefore flows in concurrent relationship with the fluid flowing in lower flow passageway 131. Ultimately, the fluid flowing through upper flow passageway 134 exits nipple 138.

As shown in FIG. 5, the solid phase change material 114 eventually reaches an advanced stage of melting. Solid phase change material 114 falls nearly to the bottom of container 112, in close proximity to lower passageway 131, in which the highest temperature heat exchange fluid is flowing.

Operation of the phase change heat material exchanger of FIGS. 3-5 during the phase change material cooling cycle is illustrated in FIGS. 6-8. Cold heat exchange fluid from a second source 123 is delivered through nipple 138 to upper flow passageway 134, from which it proceeds to flow through side flow passageways 132, 133, ultimately reaching bottom flow passageway 131 and exiting through nipple 119. Line 125 provides means for connecting source 123 to nipple 138. The lowest temperature heat exchange fluid thus flows in upper flow passageway 134, and crystals 144 of phase change material begin to form in an upper region of container 112. Once formed, crystals 144 begin to fall through the liquid phase change material 116 toward the bottom of container 112 as shown in FIG. 6.

As solidification continues, crystals 144 begin to accumulate at the bottom of container 112 as shown in FIG. 7. Liquid phase change material 116 is displaced away from the bottom of container 112 toward the top of container 112. This action again gives rise to convective currents, enhancing overall heat transfer from the liquid phase change material 116 to the heat exchange fluid. In addition, liquid phase change material 116 is forced into the region of container 112 closest to upper flow passageway 134—i.e., the lowest temperature region of container 112.

As shown in FIG. 8, when the phase change material reaches a relatively advanced stage of freezing, most of the phase change material crystals 144 have accumulated at the bottom of container 112. The remaining liquid phase change material 116 has been displaced to near the top of container 112, in close proximity to the cold heat exchange fluid.

Figure 9:
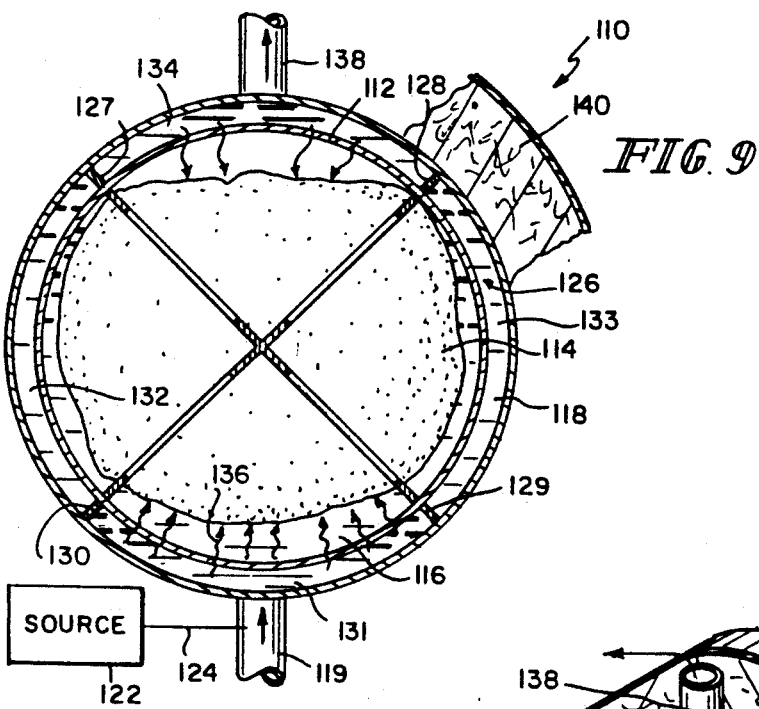
FIG. 9 is a sectional end view of a three-pass phase change material heat exchanger in accordance with the present invention during a heating cycle including a cruciform grid.

As shown in FIG. 9, according to another embodiment of the present invention, container 112 may include a cruciform grid 146. Grid 146 may be provided for structural support of container 112. It may also provide some conductive transfer of heat from the walls of container 112 to various portions of the solid slug of phase change material. Grid 146 may also optionally be used with the two-pass phase change heat material exchanger as in FIGS. 1 and 2.

Figure 10:
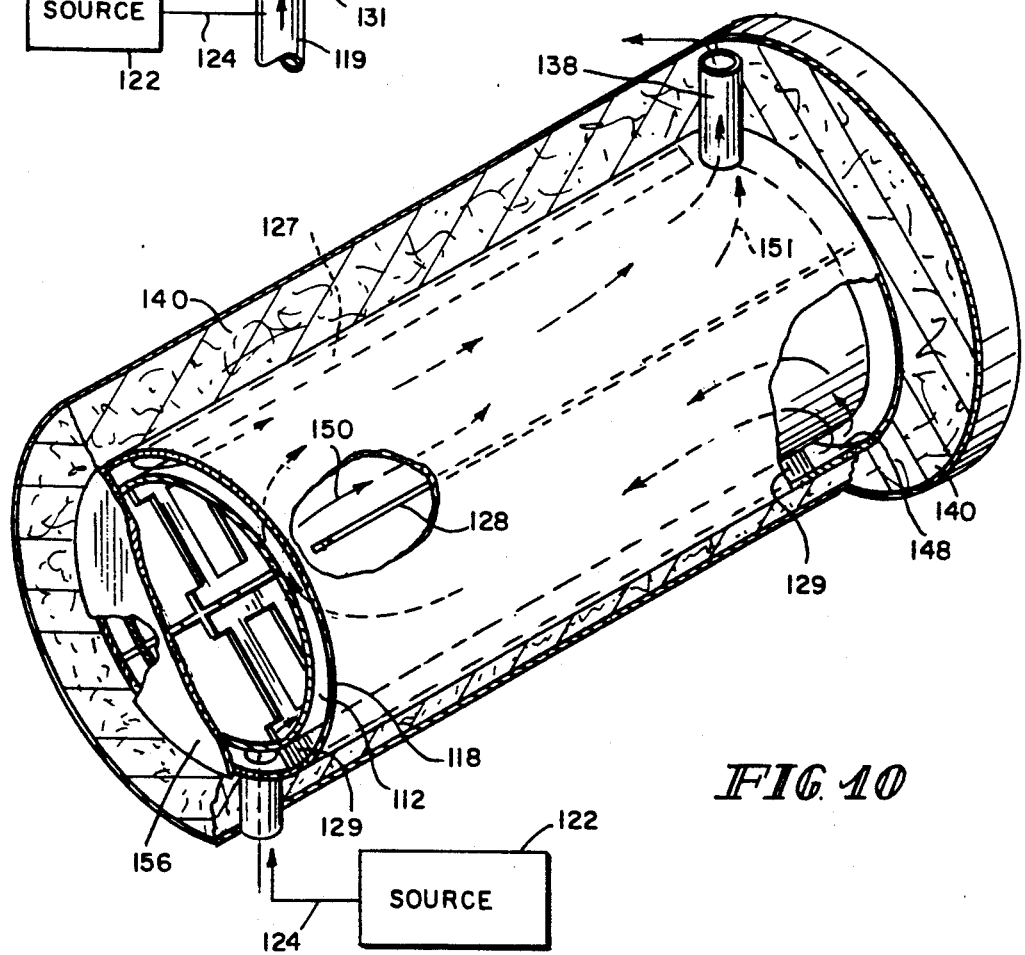
FIG. 10 is a perspective view of a three-pass phase change material heat exchanger in accordance with the present invention showing detailed the cruciform grid and flow path of heat exchange fluid.

The flow scheme for the heating cycle using the three-pass phase change heat material exchanger of FIG. 9 is detailed in the perspective view shown in FIG. 10. Heat exchange fluid from source 122 passes via line 124 through port 119 to reach lower flow passageway 131. The heat exchange fluid flows through lower flow passageway 131 along the entire length of container 112. As shown, walls 129, 130 defining lower flow passageway 131 terminate a predetermined distance from the end of container 112. This allows heat exchange fluid to exit lower flow passageway 131 and enter side flow passageways 132, 133 in the reverse direction of flow as shown by flow arrows 148.

Walls 127, 128 defining side flow passageways 132, 133 likewise do not extend the full length of container 112. Rather, they terminate a predetermined distance from the end of container 112 so that heat exchange fluid exiting side flow passageways 132, 133 can enter upper flow passageway 134 in the reverse direction of flow as shown by flow arrows 150. The heat exchange fluid flows through upper flow passageway 134 and exits through nipple 138 as shown by flow arrows 151.

The details of cruciform grid 146 are also visible in FIG. 10. As shown, grid 146 includes an X-shaped central portion 152 and four arrays of radially extending grid members 154 spaced at ninety (90) degree intervals. Of course, it will be appreciated that a number of different configurations are available for grid 146.

Also shown is an end cap 156. Alternative configurations for end cap 156 are contemplated. For example, end cap 156 could be formed with arcuate portions coincident with side flow passageways 132, 133 and upper flow passageway 134 to serve as a manifold for transferring heat exchange fluid from the side flow passageways 132, 133 to upper flow passageway 134. Heat exchange fluid exiting side flow passageways 132, 133 would pass into the manifold to be directed to upper flow passageway 134. If such an end cap were used, divider walls 127, 128 could extend the entire length of container 112.

Figure 11:
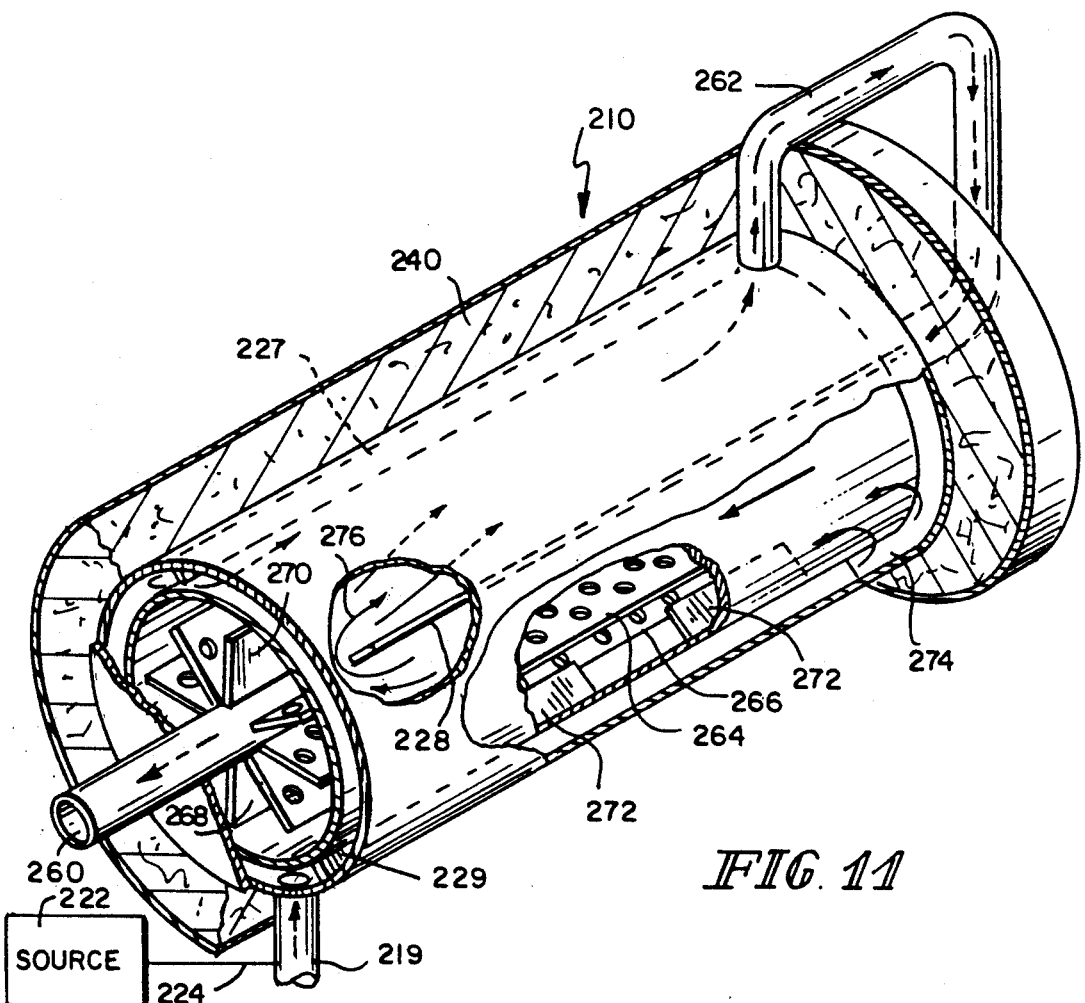
FIG. 11 is a perspective view of a four-pass phase change material heat exchanger in accordance with the present invention showing a plurality of radially oriented fins in a central passageway for passage of heat exchanger fluid therethrough.
Figures 12, 13:
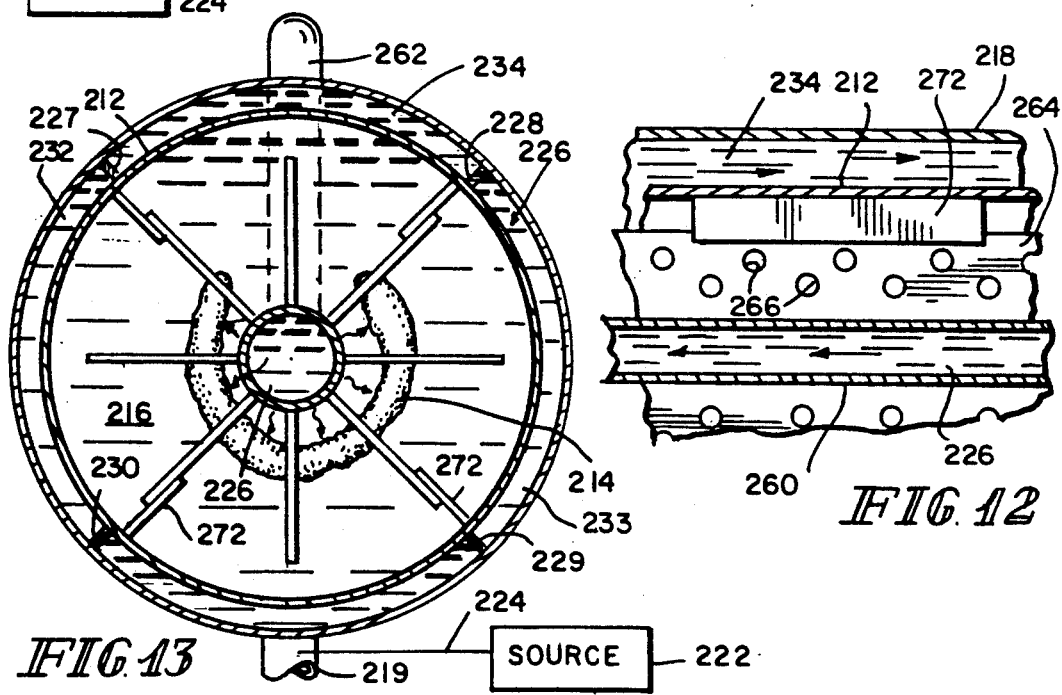
FIG. 12 is a partial sectional detailed view of the phase change material heat exchanger of FIG. 11 showing the pattern of openings formed in the radially oriented fins.
FIG. 13 is a sectional end view of the phase change material heat exchanger of FIG. 11 during the heating cycle showing a phase change material at an advanced stage of melting.

Another embodiment of a phase change heat material exchanger in accordance with the present invention is illustrated in FIGS. 11-13. A phase change heat material exchanger 210 includes a container 212 and a tube 218 surrounding the container 212 in concentric relationship therewith to define an annular space 220 therebetween. Tube 218 is provided with a port 219 to connect tube 218 in fluid communication with a source of heat exchange fluid (not shown).

Four divider walls 227, 228, 229, and 230 extend across annular space 220 between tube 218 and container 212 to define a plurality of flow passageways for heat exchange fluid. Specifically, divider walls 229, 230 cooperate to define a lower flow passageway 231. Walls 227, 230 cooperate to define a first side flow passageway 232, while walls 228, 229 cooperate to define a second side flow passageway 233. Walls 227, 228 cooperate to define an upper flow passageway 234.

Phase change heat material exchanger 210 further includes a central tube 260 extending through a central region of container 212 to conduct heat exchange fluid therethrough. A return line 262 connects upper flow passageway 234 in fluid communication with central tube 260 so that heat exchange fluid exiting upper flow passageway 234 enters return line 262 and passes to central tube 260. Thus, advantageously, heat is exchanged between the heat exchange fluid 226 and the solid phase change material 214 both at the interface defined by the wall of container 212 and at the interface defined by the wall of central tube 260.

Phase change heat material exchanger 210 also includes a plurality of heat exchange fins 264 extending radially outwardly from central tube 260. Fins 264 enhance heat transfer from the wall of central tube 260 to the solid phase change material 214 by providing heat transfer by conduction from central tube 260. It will be appreciated that the number of fins can be varied in accordance with process conditions.

As shown in FIGS. 12 and 13, fins 264 are formed to include staggered rows of openings 266 to allow passage of phase change material therethrough. Vertical fins 268 and generally are not provided with such openings. A plurality of tabs 272 extend between fins 264 and the interior wall of container 212 to provide additional heat transfer as well as structural support.

In operation of the embodiment of FIGS. 11-13 during a heating cycle, heat exchange fluid from a source 222 enters port 219 and flows through lower flow passageway 231 to exchange heat with the phase change material in container 212. At the end of lower flow passageway 231, the heat exchange fluid is forced to reverse flow directions as shown by flow arrows 274 and flow through first and second side flow passageways 232, 233. Upon reaching the end of side flow passageways 232, 233, the heat exchange fluid is again forced to reverse flow directions as shown by flow arrows 276 and enter upper flow passageway 234.

At the end of upper flow passageway 234, the heat exchange fluid enters return line 262 and flows through central tube 260, thereby making a fourth pass through heat exchanger 210. Upon exiting central tube 260, the heat exchange fluid is directed to an operating system as previously described for further use.

As described with respect to previous embodiments, during the cooling cycle, the flow scheme is reversed. Heat exchange fluid flows first through central tube 260, then enters return line 262 to reach upper flow passageway 234. From there, heat exchange fluid flows in the direction opposite to that shown by flow arrows 274, 276 through side flow passageways 232, 233 and lower flow passageway 231.

EXAMPLE

Figure 14:
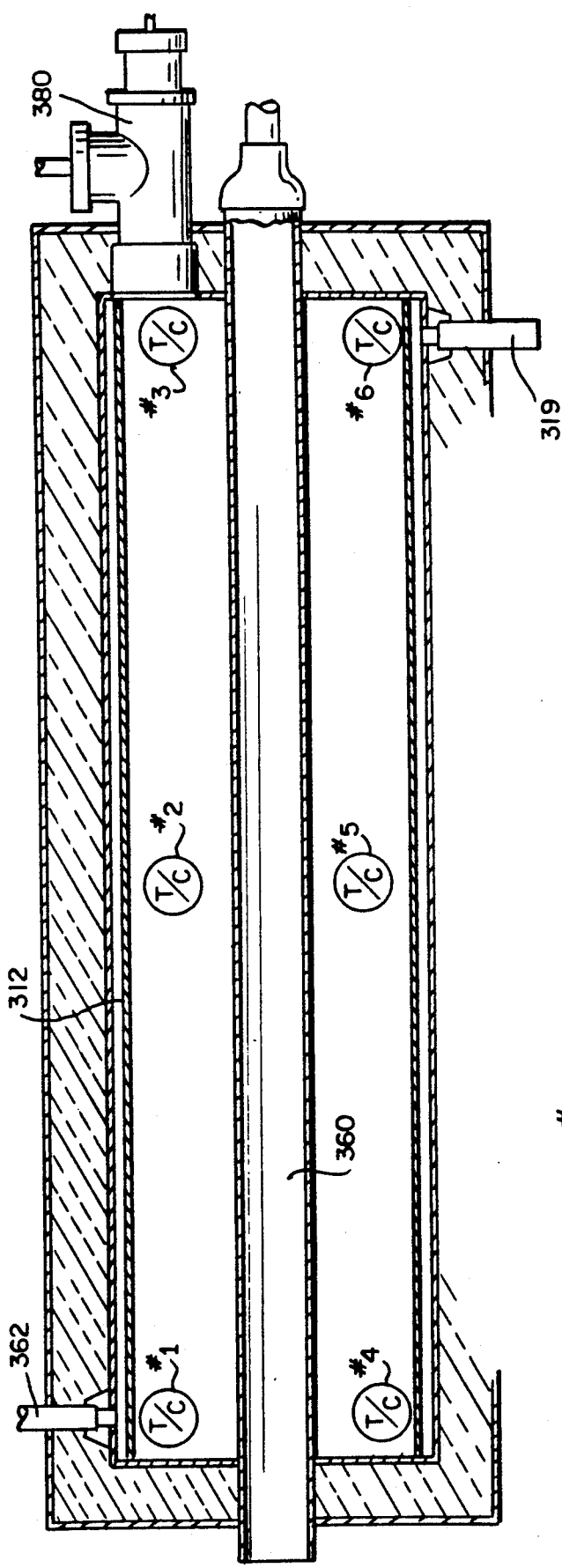
FIG. 14 is a sectional side view of a prototype heat exchanger similar to the phase change material heat exchanger of FIG. 11 showing the location of thermocouples in the prototype phase change material heat exchanger used to generate the data reported herein.

A prototype phase change material heat exchanger similar to that of FIGS. 11-13 was constructed for the purpose of testing the concept of initiating melting of the phase change material at a lower portion thereof to induce convective currents in the phase change material container. The prototype heat exchanger is illustrated in FIG. 14. As shown, the heat exchanger of FIG. 14 includes a central finned tube 360 similar to central tube 260 of FIGS. 11-13. The positions of port 319 and return line 362 are reversed in relationship to port 219 and return line 262 of FIGS. 11-13. Also shown, is a loading port 380 for loading phase change material into container 312 in the prototype of FIG. 14.

In construction of the FIG. 14 prototype, a twenty (20) inch schedule 10 pipe was fitted with ports and had its interior wall sandblasted. An eighteen (18) inch schedule 10 pipe, thirteen (13) feet three (3) inches long, was prepared with bars welded to its outer surface at approximately ninety (90) degree intervals to serve as divider walls.

A four (4) inch schedule 40 central tube or core pipe was fitted with five (5) inch depth, three-sixteenths (3/16) inch width fins welded to the central tube at approximately forty (40) degree intervals. One (1) inch diameter openings, in two rows, staggered pitch, were formed in all but the vertically extending fins. A plurality of tabs or secondary fin plates were attached to the fins to provide a near friction fit to the interior of the eighteen (18) schedule 10 container.

The prototype phase change material heat exchanger was assembled by sliding the schedule 40 central tube and fin subassembly inside the eighteen (18) inch schedule 10 container. The schedule 10 container was in turn placed inside the twenty (20) inch schedule 10 tube, the divider walls providing a near friction fit.

Figure 15:
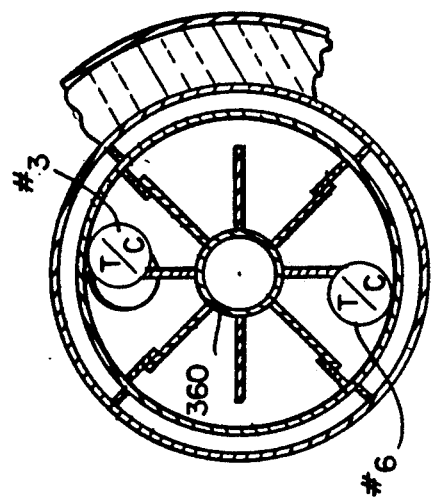
FIG. 15 is a sectional end view of the phase change material heat exchanger of FIG. 14 further showing the location of thermocouples in the prototype phase change material heat exchanger.

Six RTD thermocouples were affixed at various locations along upper and lower portions of the phase change heat material exchanger as indicated in FIGS. 14 and 15. As shown, thermocouples 1, 2, and 3 were placed in approximately equally spaced intervals to measure temperature along the upper portion of the eighteen (18) inch schedule pipe, while thermocouples 4, 5, and 6 were placed to measure temperature in the lower portion thereof. An additional four RTD thermocouples (not shown) were affixed about the central tube. Phase change material, specifically a magnesium chloride hexahydrate formulation of the type disclosed in U.S. Pat. Nos. 4,338,208 and 4,406,805, was loaded into the eighteen (18) inch schedule 10 container and the container was sealed by welding.

The phase change material heat exchanger was subjected to eighteen melt and freeze cycles. The heat exchange fluid was high temperature water supplied from an electric boiler at a flow rate of about 5 gpm and at an average inlet temperature of about 266° F. The phase change material was observed to go through phase change at 240.2° F. The time period between cycle initiation and phase change was measured for each thermocouple and hence for various regions of the phase change material heat exchanger. The thermocouples were then ranked from 1 to 6, a rank of 1 indicating that that thermocouple was the first of the group of upper or lower region thermocouples to register the phase change temperature.

As shown by the table in FIG. 16, during the melt cycle, although the highest temperature heat exchange fluid was fed to the lower region of the heat exchanger, the group of upper region thermocouples registered phase change prior to any of the group of lower region thermocouples in fourteen of the eighteen tests. This reflects the displacement of newly-formed liquid phase change material from the lower region of the heat exchanger to the upper region of the heat exchanger.

Likewise, during the freezing cycle, although the lowest temperature heat exchange fluid was fed to the upper region of the heat exchanger, the upper region thermocouples registered phase change after the lower region thermocouples in eleven of the eighteen tests. This illustrates that newly-formed crystals of solid phase change material tend to fall from the upper region of the heat exchanger to the lower region of the heat exchanger and accumulate there to form a solid mass of phase change material. As previously noted, this displaces liquid phase change material to the upper region of the heat exchanger so that liquid phase change material is kept in conductance contact with the lowest temperature heat exchange fluid.

To simplify presentation of the test results, the readings from the thermocouples affixed to the central tube are not included. Phase change was observed to occur in the region of the central tube, as measured by these thermocouples, relatively quickly; indeed, in many of the tests, these thermocouples registered phase change prior to any of the upper region thermocouples or nearly simultaneously with those thermocouples.

Although the invention has been described in detail with reference to certain preferred embodiments, variations and modifications exist within the scope and spirit of the invention as described and defined in the following claims.

We claim:

1. A heat exchanger for a phase change material having a solid density greater than its liquid density, the heat exchanger comprising
a container holding the phase change material,
a tube surrounding the container to define an annular space therebetween,
means for connecting the tube in fluid communication with a first source of heat exchange fluid to allow heat exchange fluid to flow through the annular space to exchange heat with the phase change material, and
at least two divider walls extending between the tube and the container across the annular space to divide the annular space into at least a lower flow passageway for receiving heat exchange fluid from the first source at a temperature sufficient to initiate melting of the phase change material and an upper flow passageway for receiving heat exchange fluid from the lower flow passageway to flow in counterflow relationship with the heat exchange fluid flowing in the lower passageway so that the phase change material is melted from the bottom as it moves to a lower portion of the container to cause newly-formed liquid phase change material to be displaced to an upper portion of the container.

2. The heat exchanger of claim 1, further comprising means for connecting the tube in fluid communication with a second source of heat exchange fluid, the upper passageway being configured to receive heat exchange fluid from the second source at a temperature sufficient to initiate freezing of liquid phase change material in the container so that the phase change material is frozen from the top so that the newly-formed solid phase change material falls by gravity to the lower portion of the container to displace liquid phase change material to an upper portion of the container.

3. The heat exchanger of claim 1, further comprising four divider walls extending between the tube and the container across the annular space to divide the annular space into a lower passageway for receiving heat exchange fluid from the first source, a pair of intermediate passageways for receiving heat exchange fluid from the lower passageway, and an upper passageway for receiving heat exchange fluid from the intermediate passageways.

4. The heat exchanger of claim 3, wherein the container has a circular cross-section and the divider walls are spaced at ninety (90) degree intervals about the circumference of the container.

5. The heat exchanger of claim 3, wherein the container has a circular cross-section and the divider walls are spaced about the circumference of the container so that the cross-sectional area for flow of heat exchange fluid through the lower passageway is equal to the sum of the cross-sectional areas for flow of the heat exchange fluid through the two intermediate passageways.

6. A heat exchanger for a phase change material having a solid density greater than its liquid density, the heat exchanger comprising
a container holding the phase change material,
a tube surrounding the container to define an annular space therebetween,
means for connecting the tube in fluid communication with a first source of heat exchange fluid to allow heat exchange fluid to flow through the annular space to exchange heat with the phase change material,
at least two divider walls extending across the annular space between the tube and the container to divide the annular space into at least a lower flow passageway for receiving heat exchange fluid from the first source at a temperature sufficient to initiate melting of the phase change material and an upper flow passageway for receiving heat exchange fluid from the lower flow passageway to flow in counterflow relationship with the heat exchange fluid flowing in the lower passageway so that the phase change material is melted from the bottom as it moves to a lower portion of the container to cause newly-formed liquid phase change material to be displaced to an upper portion of the container, and
a plurality of fins positioned in the container to assist in distributing heat from the walls of the container to the phase change material.

7. The heat exchanger of claim 6, further comprising means for connecting the tube in fluid communication with a second source of heat exchange fluid, the upper passageway being configured to receive heat exchange fluid from the second source at a temperature sufficient to initiate freezing of liquid phase change material in the container so that the phase change material is frozen from the top so that the newly-formed solid phase change material falls by gravity to the lower portion of the container.

8. The heat exchanger of claim 6, further comprising four divider walls extending between the tube and the container across the annular space to divide the annular space into a lower passageway for receiving heat exchange fluid from the first source, a pair of intermediate passageways for receiving heat exchange fluid from the lower passageway, and an upper passageway for receiving heat exchange fluid from the intermediate passageways.

9. The heat exchanger of claim 6, wherein the container has a circular cross-section and the divider walls are spaced at ninety (90) degree intervals about the circumference of the container.

10. The heat exchanger of claim 6, wherein the container has a circular cross-section and the divider walls are spaced about the circumference of the container so that the cross-sectional area for flow of heat exchange fluid through the lower passageway is equal to the sum of the cross-sectional areas for flow of the heat exchange fluid through the two intermediate passageways.

11. A heat exchanger for a phase change material having a solid density greater than its liquid density, the heat exchanger comprising
a container holding a phase change material,
a first tube surrounding the container to define an annular space therebetween,
means for connecting the tube in fluid communication with a first source of heat exchange fluid to allow heat exchange fluid to flow through the annular space to exchange heat with the phase change material,
at least two divider walls extending across the annular space between the tube and the container to divide the annular space into at least a lower flow passageway for receiving heat exchange fluid from the first source at a temperature sufficient to initiate melting of the phase change material and an upper flow passageway for receiving heat exchange fluid from the lower flow passageway to flow in counterflow relationship with the heat exchange fluid flowing in the lower passageway so that the phase change material is melted from the bottom as it moves to a lower portion to cause newly-formed liquid phase change material to be displaced to an upper portion of the container, and a second tube extending through the container to provide a flow passageway for heat exchange fluid discharged from the upper flow passageway.

12. The phase change heat exchanger of claim 11, wherein the container is cylindrical and the second tube is positioned concentrically within the container.

13. The phase change heat exchanger of claim 11, further comprising a plurality of fins positioned in the container to assist in distributing heat from the walls of the container to the phase change material.

14. The phase change heat exchanger of claim 13, wherein the plurality of fins is appended to the outer surface of the second tube.

15. The phase change heat exchanger of claim 13, wherein the fins are formed to include openings to permit flow of liquid phase change material therethrough.

16. The phase change heat exchanger of claim 13, wherein the plurality of fins includes first and second vertically-extending fins and a plurality of angularly-extending fins, the angularly-extending fins being formed to include openings to permit flow of liquid phase change material therethrough.

17. The phase change heat exchanger of claim 11, further comprising four divider walls extending between the tube and the container across the annular space to divide the annular space into a lower passageway for receiving heat exchange fluid from the fluid source, a pair of intermediate passageways for receiving heat exchange fluid from the lower passageway, and an upper passageway for receiving heat exchange fluid from the intermediate passageways.

18. The phase change heat exchanger of claim 17, wherein the container has a circular cross-section and the divider walls are spaced at 90 degree intervals about the circumference of the container.

19. The phase change heat exchanger of claim 17, wherein the container has a circular cross-section and the divider walls are spaced about the circumference of the container so that the cross-sectional area for flow of heat exchange fluid through the lower passageway is equal to the sum of the cross-sectional areas for flow of the heat exchange fluid through the two intermediate passageways.

* * * * *